United States Patent
Seo et al.

(10) Patent No.: US 8,649,425 B2
(45) Date of Patent: Feb. 11, 2014

(54) APPARATUS AND METHOD FOR ADJUSTING BIT RATE IN SECURITY DEVICE CONNECTED TO EXTERNAL STORAGE

(75) Inventors: Sungha Seo, Pyeongtaek-si (KR); Namkyu Ahn, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1608 days.

(21) Appl. No.: 12/175,239

(22) Filed: Jul. 17, 2008

(65) Prior Publication Data
US 2009/0190653 A1    Jul. 30, 2009

(30) Foreign Application Priority Data
Jan. 30, 2008 (KR) .................. 10-2008-0009464

(51) Int. Cl.
*H04N 7/12* (2006.01)
*H04N 11/02* (2006.01)
*H04N 11/04* (2006.01)
*H04N 7/18* (2006.01)

(52) U.S. Cl.
USPC ...................... 375/240.01; 348/143

(58) Field of Classification Search
None
See application file for complete search history.

(56) References Cited

U.S. PATENT DOCUMENTS

| | | | | |
|---|---|---|---|---|
| 5,953,261 A * | 9/1999 | Furutani et al. | ........... | 365/189.05 |
| 5,968,132 A * | 10/1999 | Tokunaga et al. | ............. | 709/247 |
| 6,188,700 B1 * | 2/2001 | Kato et al. | .................... | 370/477 |
| 6,223,221 B1 * | 4/2001 | Kunz | ............................ | 709/224 |
| 7,649,938 B2 * | 1/2010 | Chen et al. | ................ | 375/240.01 |
| 2001/0013110 A1 * | 8/2001 | Pierce et al. | .................... | 714/718 |
| 2001/0055469 A1 * | 12/2001 | Shida et al. | ....................... | 386/68 |
| 2002/0009139 A1 * | 1/2002 | Honda et al. | ............. | 375/240.03 |
| 2003/0110332 A1 * | 6/2003 | Suzuki et al. | .................... | 710/60 |
| 2003/0149715 A1 * | 8/2003 | Ruutu et al. | ................... | 709/100 |
| 2004/0225833 A1 * | 11/2004 | Fure | ............................. | 711/114 |
| 2005/0216618 A1 * | 9/2005 | Owens et al. | .................... | 710/60 |
| 2006/0083165 A1 * | 4/2006 | McLane et al. | ................ | 370/229 |
| 2006/0085534 A1 | 4/2006 | Ralston et al. | | |
| 2006/0088092 A1 * | 4/2006 | Chen et al. | ................ | 375/240.01 |
| 2007/0216781 A1 | 9/2007 | Miyanohara | | |
| 2007/0250883 A1 | 10/2007 | Busch et al. | | |
| 2007/0253509 A1 * | 11/2007 | Tanaka et al. | ................. | 375/295 |
| 2008/0069204 A1 * | 3/2008 | Uchiike | ................... | 375/240.01 |
| 2009/0245760 A1 * | 10/2009 | Kawano | ........................ | 386/131 |
| 2010/0217888 A1 * | 8/2010 | Ukita et al. | .................... | 709/234 |

FOREIGN PATENT DOCUMENTS

WO    WO 02/09389 A2    1/2002

\* cited by examiner

*Primary Examiner* — Suk Jin Kang
(74) *Attorney, Agent, or Firm* — Birch, Stewart, Kolasch & Birch, LLP (57) ABSTRACT

Disclosed are an apparatus and method for adjusting a bit rate in a security device connected to an external storage, which can determine an output bit rate optimum to the external storage in the security device for receiving a video signal shot by a plurality of cameras and writing the same on the external storage, such as a USB memory, and can vary and adjust the data input bit rate of the video signal shot properly by the plurality of cameras based on the output bit rate. The data input bit rate of a video signal inputted into the security device is higher than the data input bit rate of a video signal outputted to the external storage, thus preventing a failure of not being able to write a video signal shot by a plurality of cameras on the external storage.

24 Claims, 7 Drawing Sheets

FIG. 1

Background Art

FIG. 3

Background Art

APPARATUS AND METHOD FOR ADJUSTING BIT RATE IN SECURITY DEVICE CONNECTED TO EXTERNAL STORAGE

CROSS REFERENCE TO RELATED APPLICATIONS

This nonprovisional application claims priority under 35 U.S.C. §119(a) on Patent Application No. 10-2008-9464 filed in Republic of Korea on Jan. 30, 2008 the entire contents of which are hereby incorporated by reference.

BACKGROUND

1. Field of Invention

This document relates to an apparatus, computer program product and method for adjusting a bit rate in a security device connected to an external storage.

2. Discussion of the Related Art

Figure 1:
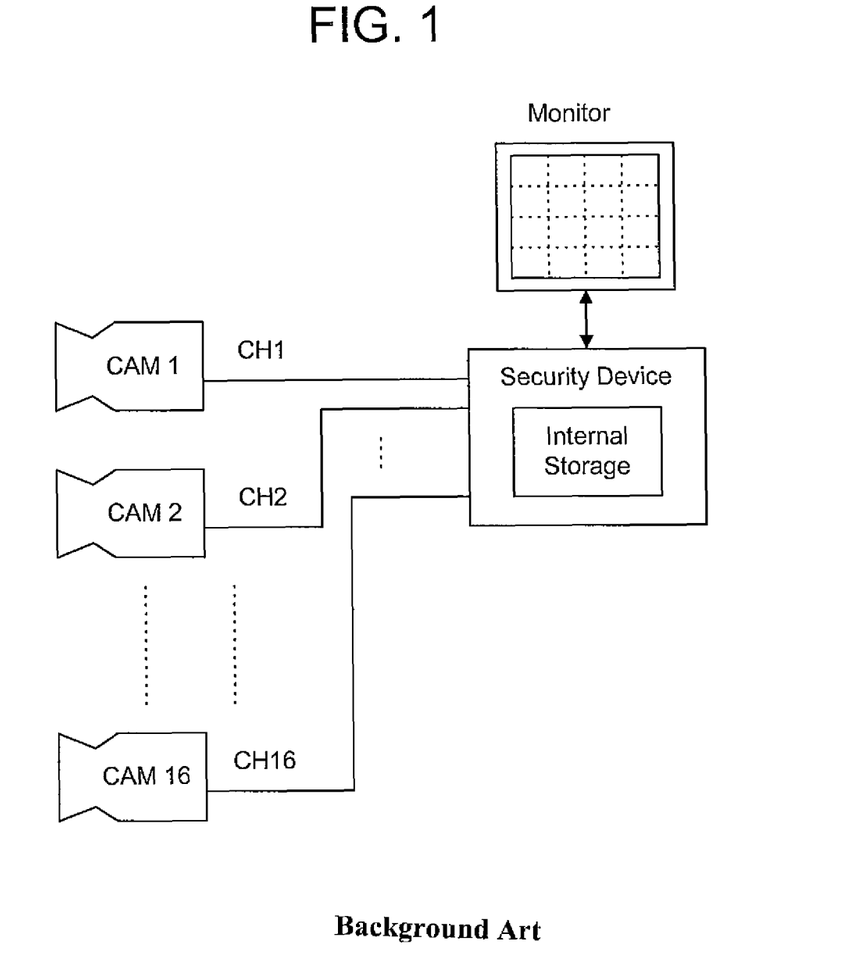
FIG. 1 is a conventional example in which a plurality of cameras is connected to a general security device.

FIG. 1 illustrates an example in which a plurality of cameras is connected to a security device. For instance, a security device, such as a digital video recorder DVR connected to 16 cameras CAM1 to CAM16 allocates and assigns first to sixteenth channel numbers CH1 to CH16 to the 16 cameras, respectively.

Then, the security device receives a video signal shot by the 16 cameras to divisionally display it on multi-channel screens of the monitor, or selects a video signal shot by a certain camera to display it on a single entire screen of the monitor.

Also, the security device receives a video signal shot from the 16 cameras and writes it on an internal storage, such as a hard disc, for each channel.

Figure 2:
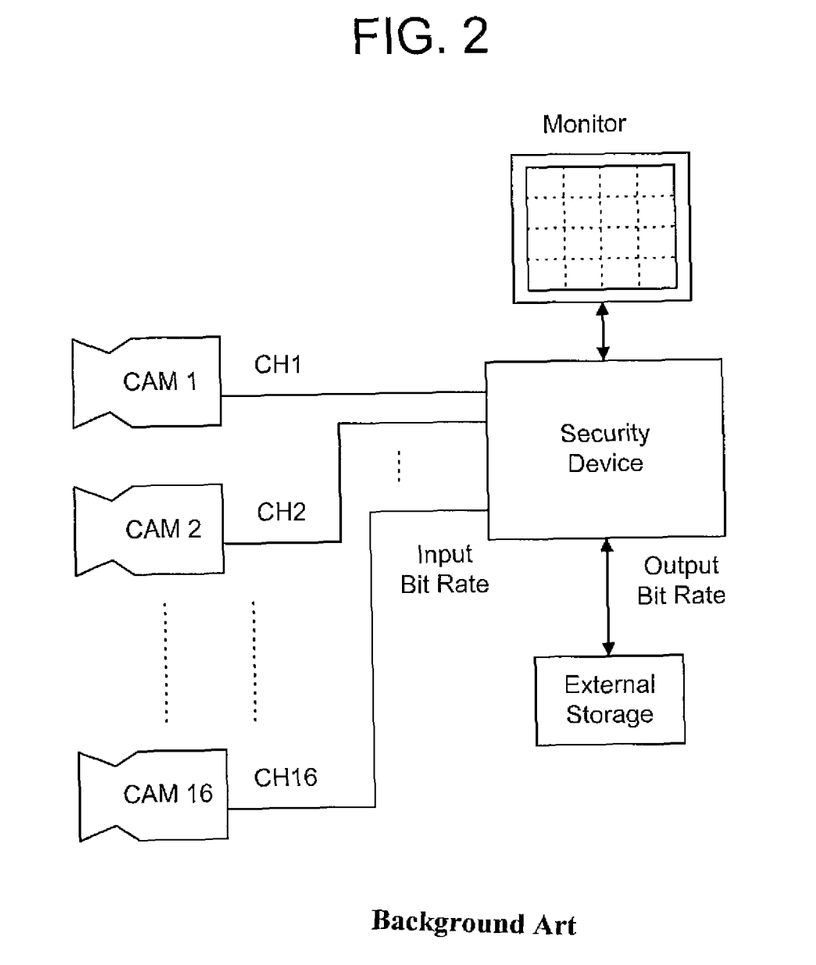
FIGS. 2 and 3 illustrate a conventional examples in which an external storage is connected to a general security device.

Meanwhile, as illustrated in FIG. 2, when an external storage, such as a USB memory, is connected to the security device, a video signal shot from the 16 cameras is written on the external storage.

Figure 3:
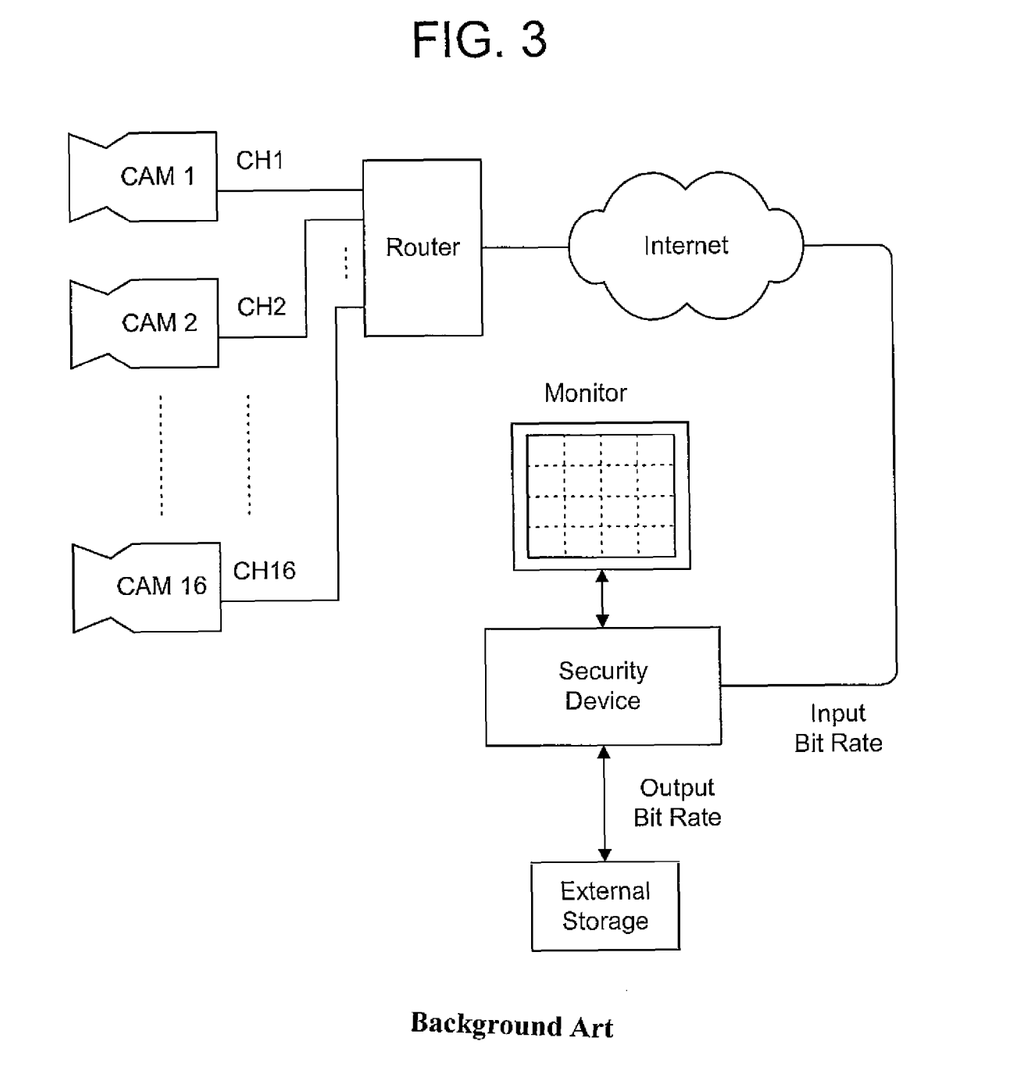

Further, as illustrated in FIG. 3, when an external storage, such as a USB memory, is connected to a digital type security device that receives a video signal shot from the 16 cameras via a router and the Internet, the video signal shot from the 16 cameras is written on the external storage.

However, if the data input bit rate of a video signal inputted into the security is higher than the data output bit rate of a video signal outputted to the external storage, there occurs the problem that the video signal shot by the 16 cameras cannot be normally written on the external storage, such as an USB memory.

SUMMARY OF THE INVENTION

The present invention has been made in an effort to provide an apparatus and method for adjusting a bit rate in a security device connected to an external storage, which can determine an output bit rate optimum to the external storage in the security device for receiving a video signal shot by a plurality of cameras and writing the same on the external storage, and can vary and adjust the data input bit rate of the video signal shot properly by the plurality of cameras based on the output bit rate.

To achieve the above advantages, there is provided an apparatus, computer program product and method for adjusting a bit rate in a security device connected to an external storage, comprising: a first step of determining an output bit rate optimum to the external storage connected through an interface; and a second step of comparing the determined output bit rate with a total input bit rate and then selectively adjusting the total input bit rate according to the result of comparison.

The first step comprises: a first sub-step of sequentially carrying out a test data write operation for dividing previously set test data into packets of different lengths and writing the same on the external storage; and a second sub-step of determining an output bit rate optimum to the external storage by detecting the slowest time taken for each bit through the test data write operation and converting the same into the number of hits per second.

In the first sub-step, the test data write operation for dividing previously set test data into packets of different lengths, from a packet with the smallest length to a packet with the largest length, gradually increasing by a predetermined length unit, and writing the same on the external storage is sequentially carried out.

In the second sub-step, an output bit rate optimum to the external storage is determined while sequentially carrying out the test data write operation by detecting the slowest time taken for each bit by division of the time taken until a response signal is received from the external storage into a total number of bits of a corresponding packet and then converting the same into a write speed per second.

In the second step, if the determined output bit rate is higher than a total input bit rate, the total input bit rate is not adjusted.

In the second step, if the determined output bit rate is lower than a total input bit rate, a warning message is displayed.

The method further comprises a step of lowering the total input bit rate by varying and adjusting one or more of a plurality of input bit rates according to a user's request.

In the second step, if the determined output bit rate is lower than a total input bit rate, the total input bit rate is lowered by varying and adjusting a plurality of input bit rate to be equal.

The method further comprises a step of displaying an announcement message for the plurality of input bit rates varied and adjusted to be equal.

In the second step, if the determined output bit rate is lower than a total input bit rate, the total input hit rate is lowered by deciding the degree of importance for each input with reference to one or more of a user's selection, the current time, and the occurrence of an object motion and then varying and adjusting a plurality of input bit rates to be different from each other.

The method further comprises a step of displaying an announcement message for the plurality of input bit rates varied and adjusted to be different from each other.

The total input bit rate is the sum of input bit rates for each camera channel allocated to a plurality of cameras connected to a security device.

A test mode for determining the output bit rate is automatically set at any one of the time points when the external storage is connected, when an amount of external impact more than a previously set reference value, and when the data written on the external storage is erased and new data is written thereon.

The output bit rate is determined as any one of the output bit rate per second of the slowest value, the output bit rate per second of the intermediate value, and the output bit rate per second of the fastest value according to a user's selection, or the output bit rate is determined as the output bit rate per second of the result value automatically down-adjusted from the determined output bit rate by a predetermined value in consideration of impact occurrence in advance.

The method further comprises a step of automatically down-adjusting the optimum output bit rate if an amount of external impact becomes more than a previously set given reference value during the writing of data on the external storage after the second step.

Furthermore, there is provided an apparatus for adjusting a bit rate in a security device connected to an external storage, comprising: an interface means for connecting with the external storage; and a control means for determining an output bit rate optimum to the external storage, comparing the same with a total input bit rate, and selectively adjusting the total input bit rate according to the result of comparison.

The apparatus further comprises a packet generating means for dividing and generating test data to be written on the external storage into packets of different lengths.

The control means operatively controls the packet generating means to sequentially carry out a test data write operation for dividing the test data into packets of different lengths and writing the same on the external storage, and determines an output bit rate optimum to the external storage by detecting the slowest time taken for each bit through the test data write operation and converting the same into a write speed per second.

The control means operatively controls the packet generating means to sequentially carry out the test data write operation for dividing previously set test data into packets of different lengths, from a packet with the smallest length to a packet with the largest length, gradually increasing by a predetermined length unit, and writing the same on the external storage.

The control means determines an output bit rate optimum to the external storage while sequentially carrying out the test data write operation by detecting the slowest time taken for each bit by division of the time taken until a response signal is received from the external storage into a total number of bits of a corresponding packet and then converting the same into a write speed per second.

If the determined output bit rate is higher than a total input bit rate, the control means does not adjust the total input bit rate.

The apparatus further comprises a message generating means for displaying a warning message if the determined output bit rate is lower than a total input bit rate.

The control means lowers the total input bit rate by varying and adjusting one or more of a plurality of input bit rates according to a user's request.

If the determined output bit rate is lower than a total input bit rate, the control means lowers the total input bit rate by varying and adjusting a plurality of input bit rate to be equal.

The control means operatively controls the message generating means to display an announcement message for the plurality of input bit rates varied and adjusted to be equal.

If the determined output bit rate is lower than a total input bit rate, the control means lowers the total input bit rate by deciding the degree of importance for each input with reference to one or more of a user's selection, the current time, and the occurrence of an object motion and then varying and adjusting a plurality of input bit rates to be different from each other.

The control means operatively controls the message generating means to display an announcement message for the plurality of input bit rates varied and adjusted to be different from each other.

The total input bit rate is the sum of input bit rates for each camera channel allocated to a plurality of cameras connected to a security device.

A test mode for determining the output bit rate is automatically set at any one of the time points when the external storage is connected, when an amount of external impact more than a previously set reference value, and when the data written on the external storage is erased and new data is written thereon.

The output bit rate is determined as any one of the output bit rate per second of the slowest value, the output bit rate per second of the intermediate value, and the output bit rate per second of the fastest value according to a user's selection, or the output bit rate is determined as the output bit rate per second of the result value automatically down-adjusted from the determined output bit rate by a predetermined value in consideration of impact occurrence in advance.

If an amount of external impact becomes more than a previously set given reference value during the writing of data on the external storage, the control means automatically down-adjusts the optimum output bit rate The apparatus, computer program product and method for adjusting a bit rate in a security device connected to an external storage according to the present invention can determine an output bit rate optimum to the external storage in the security device for receiving a video signal shot by a plurality of cameras and writing the same on the external storage, such as a USB memory, and can vary and adjust the data input bit rate of the video signal shot properly by the plurality of cameras based on the output bit rate. The data input bit rate of a video signal inputted into the security device is higher than the data input bit rate of a video signal outputted to the external storage, thus preventing a failure of not being able to write a video signal shot by a plurality of cameras on the external storage.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to the attached drawings.

First, the apparatus and method for adjusting a bit rate is applied to a security device connected to an external storage of various types, such as a USB memory, as described above with reference to FIGS. 2 and 3.

Figure 4:
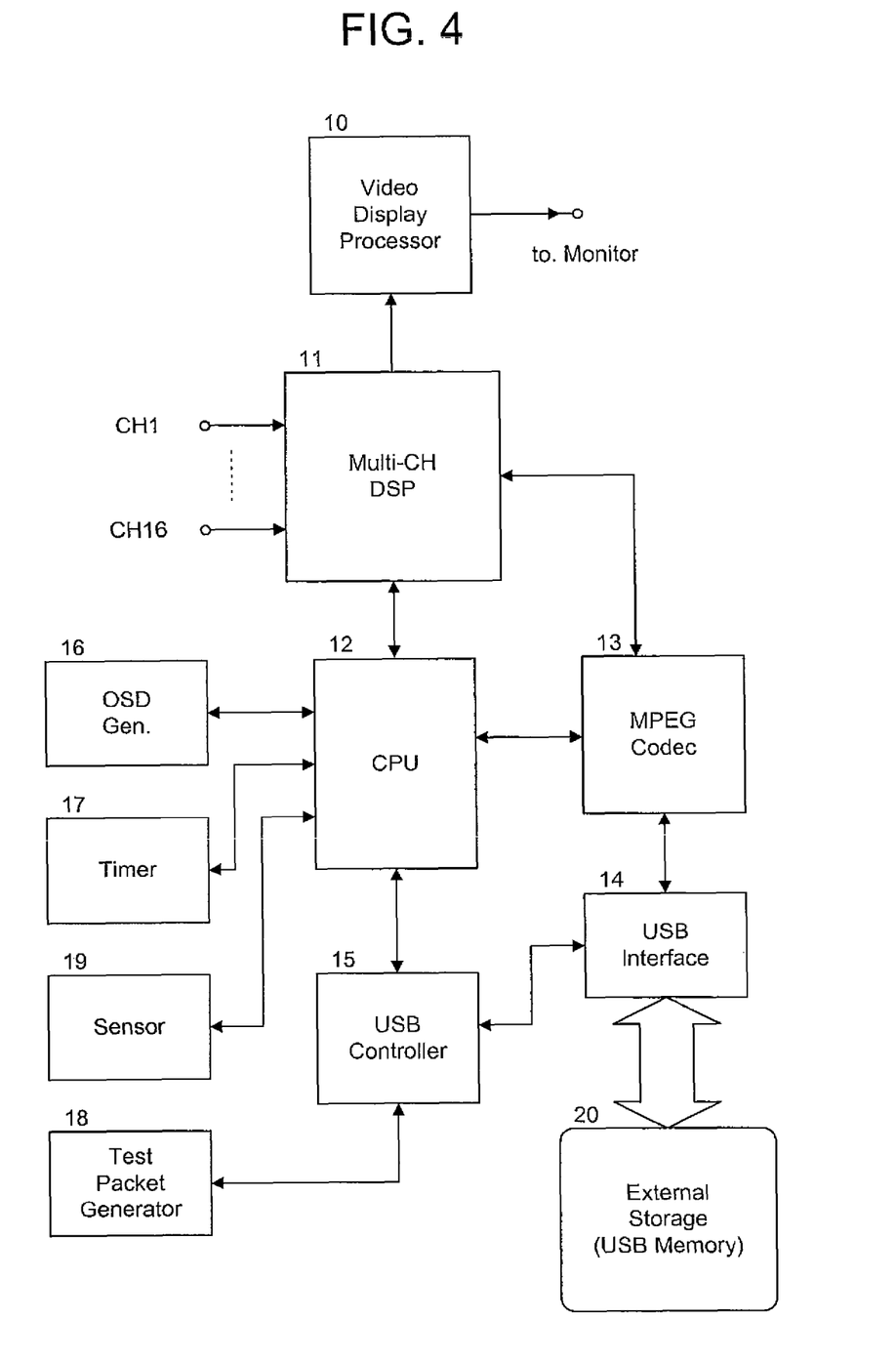
FIG. 4 illustrates the configuration of the security device connected to the external storage to which the present invention is applied.

As illustrated in FIG. 4, the security device comprises, for example, a video display processor 10, a multi-channel digital signal processor 11, a CPU 12, an MPEG codec 13, a USB interface unit 14, a USB controller 15, an OSD generator 16, a timer 17, a test packet generator 18, and a sensor 19.

The USB interface unit 14 is connected to an external storage 20, such as a USE memory, and the multi-channel digital signal processor 11 digitally signal-processes camera video signals inputted through, for example, first to sixteenth channels CH1 to CH16 allocated to 16 cameras and displays them on the monitor screen.

The MPEG codec 13 compresses and encodes the digital signals signal-processed in the multi-channel digital signal processor 11, and the USB interface unit 14 transmits the video data encoded in an MPEG format to the external storage 20, such as a USB memory and writes them.

Meanwhile, for example, the external storage 20 is connected to the USB interface unit 14, the USB controller 15 detects this connection by a plugin method, and then sets a test mode for writing previously set test data in order to determine an output bit rate optimum to the external storage 20.

The USB controller 15 operatively controls the test packet generator 18 to generate the previously set test data in packets of different lengths and to then transmit them to the external storage 20 and to write them. The USB controller 15 determines an output bit rate optimum to the external storage based on a response signal received from the external storage 20.

Figure 5:
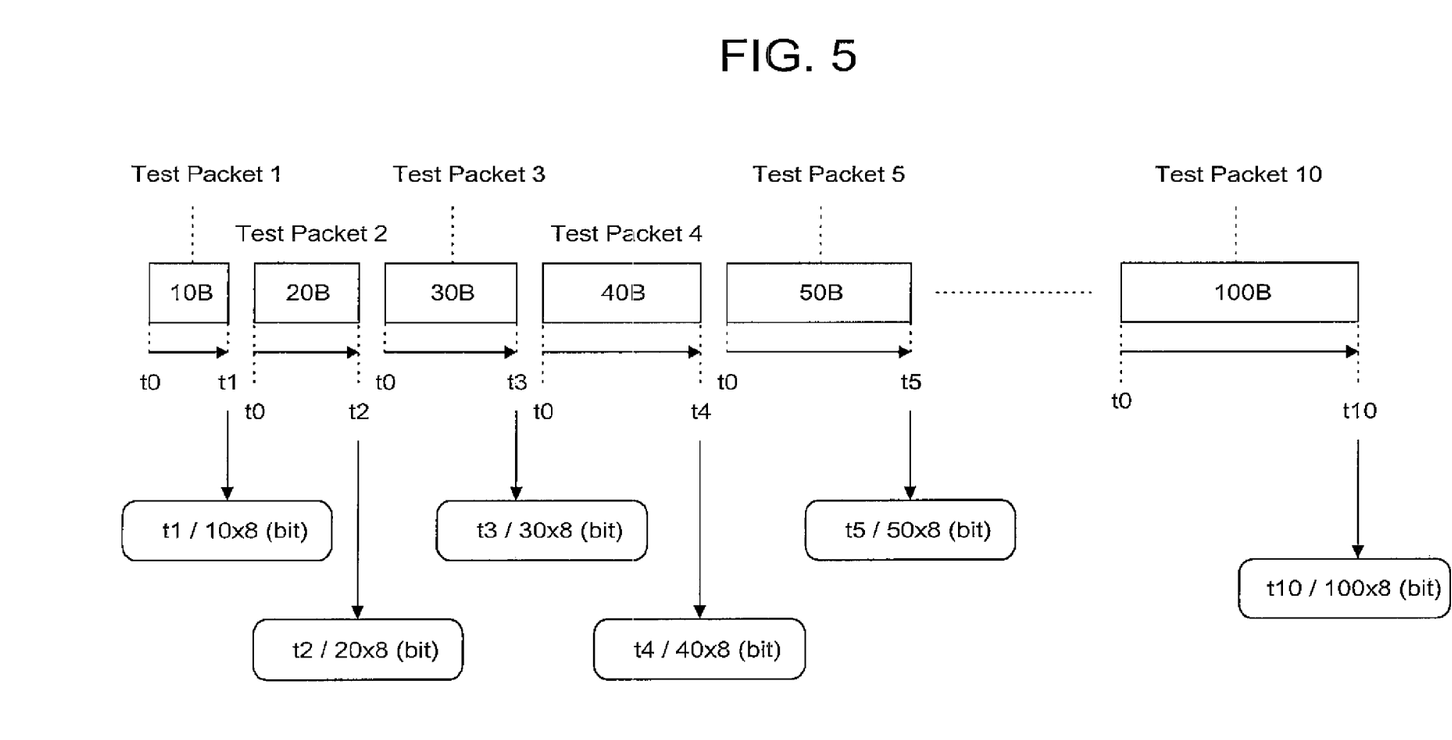
FIG. 5 illustrates an embodiment in which test packets of different lengths are divided and written on the external storage according to the present invention.

For example, as illustrated in FIG. 5, the USB controller 15 operatively controls the test packet generator 18 to generate a first test packet Test Packet 1 of 10 bytes and to then transmit it to the external storage 20 through the USB interface unit 14, and thereafter receives a response signal transmitted from the external storage 20.

Then, the USB controller 15 divides the time t1 taken until the response signal is received after the transmission of the first test packet into a total number of bits of the first test packet, and temporarily stores the time taken for each bit (t1/10×8(bit)).

Also, the USB controller 15 operatively controls the test packet generator 18 to generate a second test packet Test Packet 2 of 20 bytes and then transmit it to the external storage 20 through the USB interface unit 14, and thereafter receives a response signal transmitted from the external storage 20.

Then, the USB controller 15 divides the time t2 taken until the response signal is received after the transmission of the second test packet into a total number of bits of the second test packet, and temporarily stores the time taken for each bit (t2/20×8(bit)). In one embodiment, as illustrated in FIG. 5, the USB controller 15 repeatedly carries out the above test operation while gradually increasing the test data by a length unit of 10 bytes.

Afterwards, when the time taken for each bit (t10/100×8 (bit)) is calculated by dividing the time t10 taken until the response signal is received after the transmission of a tenth test packet Test Packet 10 of 100 bytes into a total number of bits of the tenth test packet, as illustrated in FIG. 5, the slowest time is detected among the times taken for each bit to write the first to tenth test packets, respectively.

For example, among the first to tenth test packets, if the time taken for each bit to write the second test packet Test Packet 2 of 20 bytes is the slowest, the USB controller 15 converts the time taken for each bit into the number of bits per second and determines it as an optimum output bit rate capable of most stably writing MPEG video data on the external storage 20.

The USB controller 15 outputs the optimum output bit rate determined through the above procedure to the CPU 12, and the CPU 12 adds up the input bit rates of each camera channel inputted into the multi-channel signal processor 11 to calculate a total input bit rate, and then compares it with the output bit rate.

According to the result of comparison, the CPU 12 varies and adjusts the data input bit rate of a video signal shot by the plurality of cameras so that data can be stably written on the external storage 20.

Figure 6:
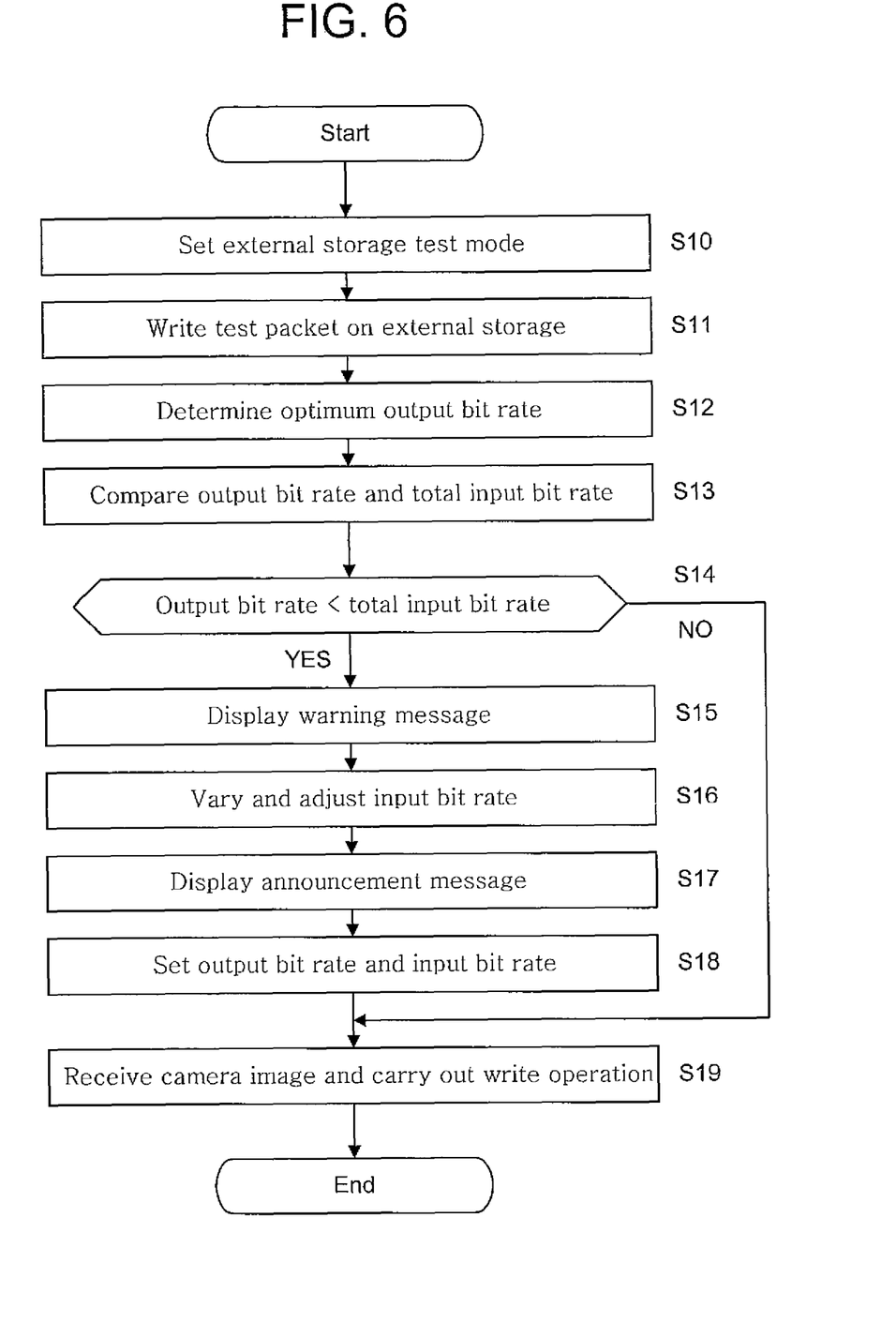
FIG. 6 illustrates an operation flow chart for a method for adjusting a bit rate in a security device connected to an external storage according to the present invention.

FIG. 6 illustrates an operation flow chart for a method for adjusting a bit rate in a security device connected to an external storage according to the present invention. For example, when the external storage 20 is connected to the USB interface unit 14, the USB controller 15 sets a test mode automatically or according to a user's request (S10).

Then, the USB controller 15 operatively controls the test packet generator 18 to carry out a series of test packet write operation steps for generating previously set test data as test packets (e.g. Test Packets 1 to 10) of different lengths and then transmitting them on the external storage 20 and writing them (S11).

Further, as described with reference to FIG. 5, the USB controller 15 receives a response signal from the external storage 20, and then detects the slowest time taken for each bit until the corresponding response signal is received after the transmission of a test packet.

The detected slowest time is converted into the number of bits per second to determine an output bit rate optimum to the external storage 20 (S12), and the determined optimum output bit rate is outputted to the CPU 12.

The CPU 12 adds up the input bit rates of the plurality of camera channels inputted into the multi-channel signal processor 11 to calculate a total input bit rate, and then compares it with the output bit rate (S13).

As the result of comparison, if the output bit rate is higher than the total input bit rate (S14), the OSD generator 16 is operatively controlled to output and display a warning message (S15).

Figure 7:
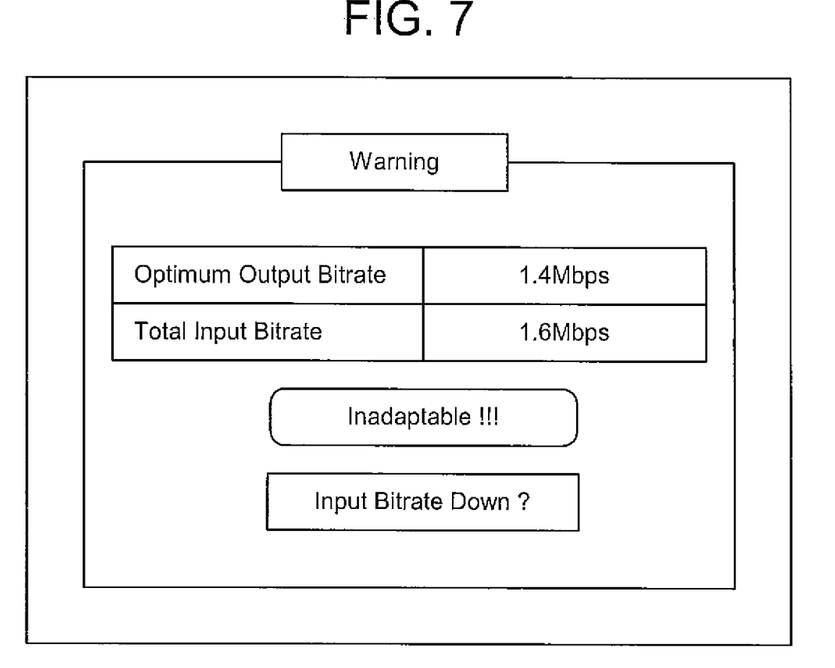
FIG. 7 illustrates an embodiment of a warning message screen displayed according to the present invention.

In one embodiment, as illustrated in FIG. 7, the warning message may contain an optimum output bit rate (e.g., 1.4 Mbps) suitable for the external storage 20 and a total input bit rate (e.g., 1.6 Mbps) for the plurality of camera channels inputted into the multi-channel digital signal processor 11.

Moreover, the warning message may contain a menu item for selecting the down-adjusting of an input bit rate, along with the warning message notifying of an inadaptable state in which the total input bit rate is higher than the output bit rate.

Meanwhile, when a user selects the menu item, the CPU 12 operatively controls the OSD generator 16 to output and display a menu screen of a list format for varying and adjusting an input bit rate for each camera channel.

Figure 8:
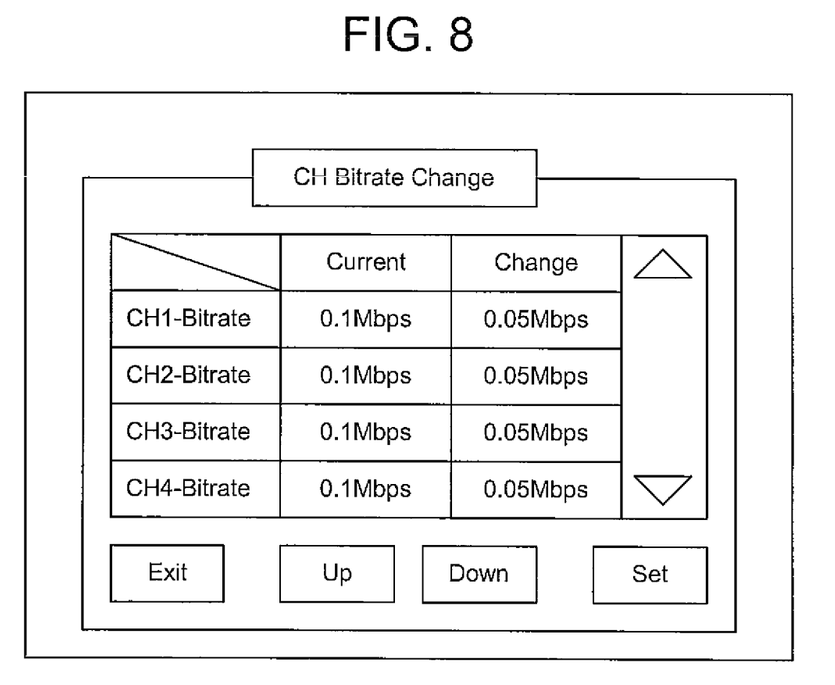
FIG. 8 illustrates an embodiment of a menu screen for varying and adjusting an input bit rate according to the present invention.

In one embodiment, as illustrated in FIG. 8, on the menu screen, an input bit rate for each camera channel and an input bit rate to be selected and changed arbitrarily by the user may be displayed in a list format in conjunction with each other.

Therefore, the user down-adjusts the input bit rates of the first to fourth channels, among the camera channels displayed on the menu screen, from 0.1 Mbps to 0.05 Mbps (S16) so that the total input bit rate for the 16 camera channels may not exceed the output bit rate (e.g., 1.4 Mbps).

Meanwhile, with the warning message not outputted and displayed, or with the warning message outputted and displayed, the CPU 12 may check and collectively down-adjust the input bit rates for the respective camera channels For instance, if the output bit rate is 1.4 Mbps and the total input bit rate for the 16 camera channels is 1.6 Mbps, the input bit rates for the respective 16 camera channels are collectively adjusted from 0.1 Mbps to 0.875 Mbps so that the total input bit rate for the 16 camera channels may not exceed the output bit rate.

Moreover, with the warning message not outputted and displayed, or with the warning message outputted and displayed, the CPU 12 may check the input bit rates for the respective camera channels, and may vary and adjust the input bit rates to be different from each other after deciding the degree of importance for each camera channel according to the result of the occurrence of various events, such as the current time counted by the timer 17 and an object motion detected by the multi-channel signal processor 11.

For instance, with the degree of importance for the first camera channel from 6 pm until 7 pm set to 100% by the user, when the current time counted by the timer 17 is between 6 pm and 7 pm, the CPU 12 sets the input bit rate for the first camera channel relatively higher than the input bit rates for the other camera channels.

Then, the multi-channel signal processor 11 carries out a typical object motion detection operation for detecting an object motion component by capturing a video frame (e.g., Frame #n) of each camera channel and then comparing it with the previously captured video frame (e.g., Frame #n−1), and the CPU 12 sets the degree of importance relatively high for the camera channel from which a lot of object motions are detected to thus set the input bit rate of the corresponding camera channel relatively higher than the input bit rates of the other camera channels.

For example, if the degree of importance of the first to eighth camera channels is two times higher than the degree of importance of the ninth to sixteenth camera channels when the output bit rate is 1.4 Mbps, the total input bit rate for the 16 camera channels is 1.6 Mbps and the input bit rate for each camera channel is 0.1 Mbps, the CPU 12 maintains the input bit rate of the first to eighth camera channels at 0.1 Mbps, and down-adjusts the input bit rate for the ninth to sixteenth camera channels to 0.75 Mbps, thereby preventing the total input bit rate for the 16 camera channels from exceeding the output bit rate.

Once the input bit rate is varied and adjusted as above, the CPU 15 operatively controls the OSD generator 16 to output and display an announcement message notifying the variation and adjustment of the input bit rate (S17).

Further, the CPU 15 operatively controls the MPEG Codec 13 to set the output bit rate outputted to the external storage 13 as an optimum output bit rate (e.g., 1.4 Mbps) determined by the test mode, and set the input bit rate for each camera channel inputted into the multi-channel digital signal processor 11 to the input bit rate adjusted as above (S18).

Then, with the output bit rate and the input bit rate set as above, a data write operation for receiving a camera image and writing it on the external storage is carried out (S19). Thus, the data input bit rate inputted into the security device is higher than the data output bit rate outputted to the external storage, thereby preventing a failure of not being able to write a video signal on the external storage.

If an amount of external impact detected by the sensor 19, for example, an acceleration detection sensor 19, is more than a previously set given reference value, the CPU 12 may automatically sets the test mode, or may write all the data on the external storage 20 and then automatically set the test mode when a rewriting time point for erasing the data and writing new data is reached.

Additionally, the optimum output bit rate determined through the test operation may be determined as any one of the output bit rate per second of the slowest value, the output bit rate per second of the intermediate value, and the output bit rate per second of the fastest value according to a user's selection.

Also, the optimum output bit rate may be determined as the output bit rate per second of the result value automatically down-adjusted from the determined output bit rate by a pre-determined value (e.g., 0.1 Mbps). So, even if the external impact will be occur, writing operation will be stable.

Besides, if the amount of external impact detected by the sensor 19 exceeds a previously set given reference value during the writing of data by application of the optimum output bit rate, the optimum output bit rate may be automatically down-adjusted by a predetermined value (e.g., 0.1 Mbps) so that a stable data write operation may be carried out.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The above-described preferred embodiments of the present invention are disclosed for illustrative purposes Those skilled in the art can achieve modifications, variations, substitutions or additions associated with various other embodiments within the spirit and technical scope of the present invention disclosed in the accompanying claims.

What is claimed is:

1. A method for adjusting a bit rate in a security device connected to an external storage through an interface, comprising:
   sequentially carrying out a test data write operation and writing test data on the external storage;
   determining an output bit rate optimum to the external storage by detecting a slowest time taken for each bit through the test data write operation and converting the detected time for each bit into the output bit rate optimum to the external storage; and
   comparing the determined output bit rate with a total input bit rate of signals from a plurality of cameras connected to the security device to generate a comparison result and then selectively adjusting the total input bit rate according to the comparison result,
   wherein the step of comparing the determined output bit rate comprises displaying a warning message when the determined output bit rate is lower than the total input bit rate.

2. The method according to claim 1, wherein the step of sequentially carrying out a test data write operation comprises:
   sequentially dividing previously set test data into packets of different lengths, from a packet with a smallest length to a packet with a largest length, while gradually increasing packet length by a predetermined length unit and writing the packets of different lengths on the external storage.

3. The method according to claim 2, wherein the step of detecting an output bit rate comprises:
   detecting a slowest time taken for each bit by dividing a time taken until a response signal is received from the external storage into a total number of bits of a corresponding packet to generate a division result and then converting the division result into a write speed per second.

4. The method according to claim 1, wherein the step of comparing the determined output bit rate comprises:
not adjusting the total input bit rate when the determined output bit rate is higher than the total input bit rate.

5. The method according to claim 1, further comprising:
lowering the total input bit rate by adjusting one or more of a plurality of input bit rates according to a user's request.

6. The method according to claim 1, wherein the step of comparing the determined output bit rate comprises:
lowering the total input bit rate by adjusting a plurality of input bit rate to be equal when the determined output bit rate is lower than the total input bit rate.

7. The method according to claim 6, further comprising:
displaying an announcement message when the plurality of input bit rates are adjusted to be equal.

8. The method according to claim 1, wherein the step of comparing the determined output bit rate comprises:
lowering the total input bit rate, when the determined output bit rate is lower than the total input bit rate, in response to one or more of a user's selection, a current time, and an occurrence of an object motion; and
adjusting a plurality of input bit rates to be different from each other.

9. The method according to claim 8, further comprising:
displaying an announcement message when the plurality of input bit rates are adjusted to be different from each other.

10. The method according to claim 1, further comprising:
automatically setting a test mode for determining the output bit rate at any one of plural time points when
the external storage is connected,
an amount of external impact is determined to be more than a previously set reference value, and
data previously written on the external storage is erased and new data is to be written thereon.

11. The method according to claim 1, wherein the step of determining comprises:
determining the output bit rate to be any one of
an output bit rate per second of a slowest value,
an output bit rate per second of an intermediate value,
an output bit rate per second of a fastest value according to a user's selection, and
an output bit rate per second of a result value automatically down-adjusted from the determined output bit rate by a predetermined value.

12. The method according to claim 1, further comprising:
automatically down-adjusting the optimum output bit rate if an amount of external impact exceeds a previously set given reference value while writing data on the external storage after the step of determining an output bit rate optimum to the external storage.

13. An apparatus for adjusting a bit rate in a security device connected to an external storage, comprising:
an interface configured to connect with the external storage;
a message generator configured to generate a message; and
a controller configured to
control the interface to sequentially carry out a test data write operation on the connected external storage for the di
determine an output bit rate optimum to the external storage by detecting a slowest time taken for each bit through the test data write operation and converting the slowest time into a write speed per second,
compare the optimum output bit rate with a total input bit rate of signals from a plurality of cameras connected to the security device to produce a comparison result,
selectively adjust the total input bit rate according to the comparison result, and
control the message generator to generate a warning message if the determined output bit rate is lower than the total input bit rate.

14. The apparatus according to claim 13,
wherein the apparatus further comprises a packet generator configured to divide test data to be written on the external storage into packets, and
wherein the controller is configured to control the packet generator to sequentially carry out the test data write operation by dividing previously set test data into packets of different lengths, from a packet with a smallest length to a packet with a largest length, gradually increasing packet length by a predetermined length unit, and writing the packets of different lengths on the external storage.

15. The apparatus according to claim 13, wherein the controller is configured to determine the output bit rate optimum to the external storage while sequentially carrying out the test data write operation by detecting a slowest time taken for each bit by dividing a time taken until a response signal is received from the external storage into a total number of bits of a corresponding packet to produce a division result and then converting the division result into a write speed per second.

16. The apparatus according to claim 13, wherein the controller is configured to not adjust the total input bit rate when the determined output bit rate is higher than the total input bit rate.

17. The apparatus according to claim 13, wherein the controller is configured to lower the total input bit rate by adjusting one or more of a plurality of input bit rates according to a user's request.

18. The apparatus according to claim 17, wherein the controller is configured to lower the total input bit rate by adjusting a plurality of input bit rate to be equal when the determined output bit rate is lower than the total input bit rate.

19. The apparatus according to claim 18, wherein the controller is configured to control the message generator to display an announcement message when the plurality of input bit rates are adjusted to be equal.

20. The apparatus according to claim 13, wherein the controller is configured to lower the total input bit rate, when the determined output bit rate is lower than a total input bit rate, in response to one or more of
a user's selection,
a current time, and
an occurrence of an object motion, the controller further configured to adjust a plurality of input bit rates to be different from each other.

21. The apparatus according to claim 20, wherein the controller is configured to control the message generator to display an announcement message when the plurality of input bit rates are adjusted to be different from each other.

22. The apparatus according to claim 13, wherein the controller is configured to automatically set a test mode for determining the output bit rate at any one of the time points when
the external storage is connected to the security device,
an amount of external impact is more than a previously set reference value, and data written on the external storage is erased and new data is to be written thereon.

23. The apparatus according to claim 13, wherein the controller is configured to determine the output bit rate to be any one of
- an output bit rate per second of a slowest value,
- an output bit rate per second of an intermediate value,
- an output bit rate per second of a fastest value according to a user's selection, and
- an output bit rate per second of a result value automatically down-adjusted from the determined output bit rate by a predetermined value.

24. The apparatus according to claim 13, wherein the controller is configured to automatically down-adjust the optimum output bit rate, when an amount of external impact exceeds a previously set given reference value while writing of data on the external storage.

* * * * *